Patented Dec. 20, 1932

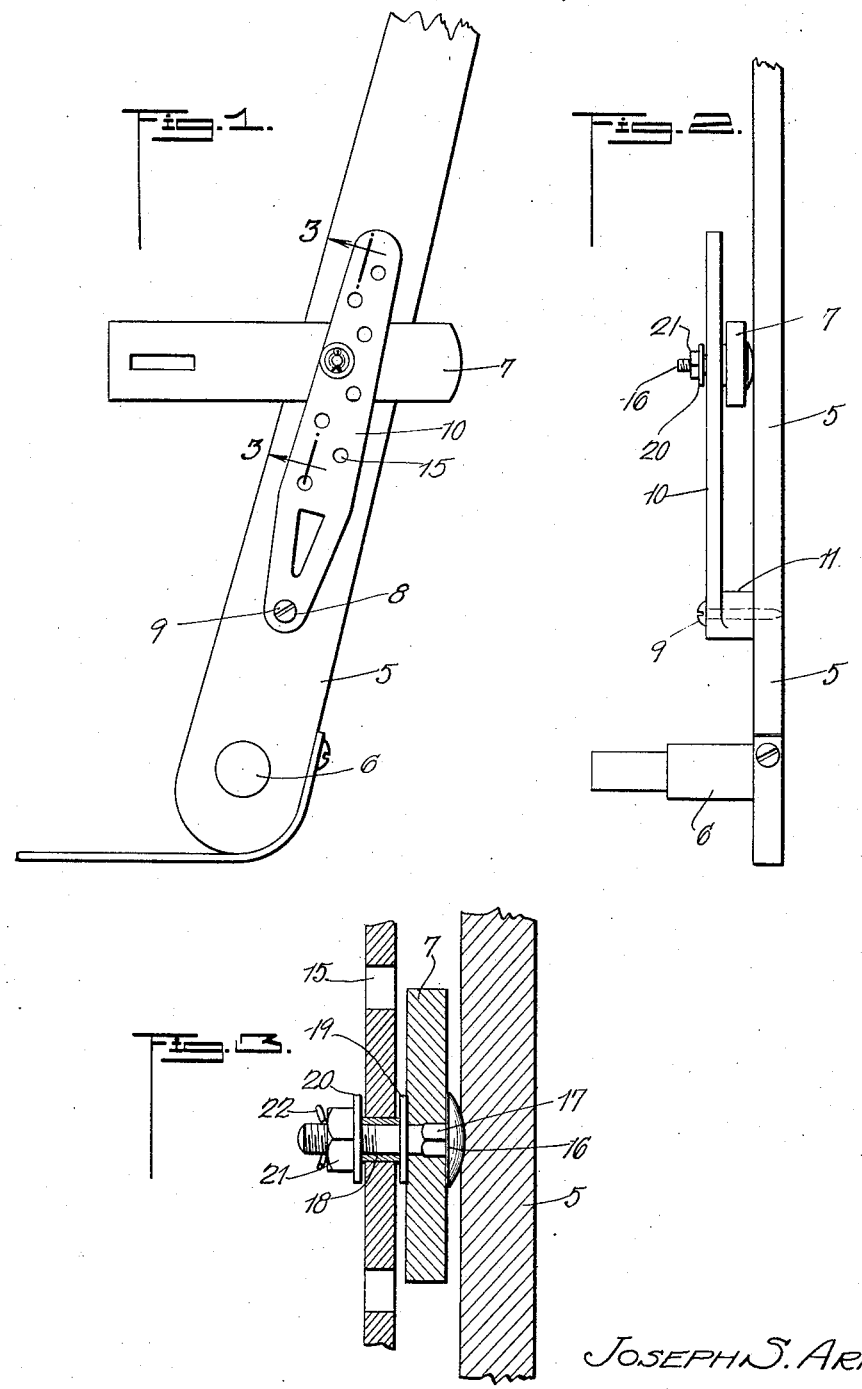

1,891,464

UNITED STATES PATENT OFFICE

JOSEPH S. ARIENTA, OF PATERSON, NEW JERSEY

LOOM PICKER STICK

Application filed January 15, 1932. Serial No. 586,790.

The present invention relates to new and useful improvements in loom picker sticks, and more particularly it pertains to a new and novel means for attaching the lug-strap of the sweep arm to a picker stick.

An object of the invention resides in a new and novel means for attaching a lug-strap to a picker stick in such a manner that accidental disconnection of the sweep arm with the picker stick is prevented.

A further object of the invention resides in a novel mechanism whereby suitable adjustment between the attachment of the lug-strap and the picker stick may be obtained thus rendering the device capable of use on looms of any type employing a picker stick.

A further object of the invention resides in a novel mechanism whereby the lug-strap may be readily connected and disconnected with respect to the picker stick.

With the above and other objects in view, reference will be had to the accompanying drawing, wherein:

Figure 1 is a view in elevation of a picker stick showing the improved attachment carried thereby, the upper end of the picker stick being broken away, Figure 2 is a similar view taken at right angles to Figure 1, and;

Figure 3 is a detail sectional view taken on the line 3—3 of Figure 1.

Referring more particularly to the drawing, the numeral 5 designates the picker stick which is mounted in the ordinary manner upon a lug or the like 6. The reference character 7 designates the lug-strap and this lug-strap is carried by a sweep-arm not herein illustrated.

Secured to the picker stick 5 as at 8 by means of a screw or the like 9, there is an arm 10. This arm 10 is formed near one end with a lug 11 and the arm and lug are formed with a perforation for the reception of the screw 9. The screw 9 secures the arm to the picker stick and the lug 11 provides for spacing the arm 10 with respect to the picker stick as clearly shown in Figure 2 of the drawing.

The arm 10 is formed with a plurality of openings or the like 15 which are arranged in staggered relation and extend throughout the main portion of the length of the body of said arm.

As best illustrated in Figure 3, the lug-strap 7 carries a bolt 16 having a squared portion 17 which engages the lug-strap 7. This bolt 16 is adapted to be mounted in one of the openings 15 of the arm 10, and that opening in which the bolt is to be received is provided with a removable bushing 18. At the inner end of the bushing 18 there is a washer 19 and at the outer end of said bushing there is a washer 20. These parts are held in their assembled relation by means of a nut 21 threaded upon the free end of the bolt 16 and held thereon against accidental displacement by means of a cotter pin or the like 22.

The bushing 18 is removable from the openings 15, and in order to make an adjustment it is only necessary to remove the cotter pin 22 and the nut 21 when the bolt 16 will be free to be removed from the openings 15 in which it is positioned. The bushing may next be removed and inserted in the desired opening after which the parts are reassembled as heretofore described.

From the foregoing it will be apparent that the present invention provides a new and novel form of means for attachment of a lug-strap to a picker stick in which the several parts are readily removable for the purpose of making an adjustment and in which all the parts are securely held in operative position.

While the invention has been herein illustrated in a preferred form, it is to be understood that it is not to be limited to the specific construction herein shown, and that it may be practiced in other forms without departing from the spirit thereof.

Having thus described the invention, what is claimed as new and what it is desired to secure by Letters Patent of the United States, is:

1. A lug strap attaching means for loom picker sticks comprising an arm, a lug projecting from one of the faces of said arm, said arm and said lug having a perforation passing therethrough, means passing through said perforation to secure said arm to loom picker stick with the lugs spacing the arm from the picker stick, a plurality of staggered perforations in said arm, a lug strap, and means on the lug strap removably mounted in one of the staggered perforations of the arm.

2. A lug-strap attaching means for loom picker sticks comprising an arm, a lug projecting from one of the faces of said arm, said arm and lug having a perforation passing therethrough, means passing through said perforation to secure said arm to loom picker stick with the lug spacing the arm from the picker stick, a plurality of staggered perforations in said arm, a lug-strap, means for attaching said lug-strap to said arm, said last mentioned means comprising a bolt removably mounted in one of the staggered openings of the arm and through an opening in the lug-strap.

3. A lug-strap attaching means for loom picker sticks comprising an arm, a lug projecting from one of the faces of said arm, said arm and lug having a perforation passing therethrough, means passing through said perforation to secure said arm to loom picker stick with the lug spacing the arm from the picker stick, a plurality of staggered perforations in said arm, a lug-strap, means for attaching said lug-strap to said arm, said attaching means comprising a bushing having removable engagement with one of the staggered openings in the arm, a bolt adapted to pass through said bushing, said bolt being mounted on said lug-strap with its free end projecting beyond said arm.

4. In combination with a loom picker stick, an arm, means for securing said arm to said picker stick with a portion of the arm spaced from the picker stick, a plurality of spaced openings formed in said arm and arranged in staggered relation, a lug-strap, a bolt carried by said lug-strap and having a projecting end for engagement in one of said openings, a bushing removably mounted in that opening in which the bolt is to be received, said bushing adapted to receive said bolt, a washer on said bolt at each end of the bushing, a nut threaded on the free end of said belt, and a cotter pin passing through the bolt to prevent accidental displacement of the nut.

In testimony whereof I affix my signature.

JOSEPH S. ARIENTA.